United States Patent
Chiu et al.

(10) Patent No.: US 12,547,279 B2
(45) Date of Patent: Feb. 10, 2026

(54) ILLUMINATED TOUCHPAD HAVING PARALLAX BARRIER LIGHT SOURCE MODULE

(71) Applicant: Acer Incorporated, New Taipei (TW)

(72) Inventors: Yi-Jung Chiu, New Taipei (TW); Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/416,914

(22) Filed: Jan. 19, 2024

(65) Prior Publication Data

US 2025/0147627 A1    May 8, 2025

(30) Foreign Application Priority Data

Nov. 2, 2023    (TW) .................................. 112142134

(51) Int. Cl.
    *G06F 3/042*    (2006.01)
(52) U.S. Cl.
    CPC .................................... *G06F 3/042* (2013.01)
(58) Field of Classification Search
    CPC .. G06F 1/1643; G06F 1/1692; G06F 3/03547; G06F 3/0393; G06F 3/041–0412; G06F 3/0418; G06F 3/042; G06F 3/0426; G06F 3/04815–04842; G06F 3/0487–04886; G06F 2203/04103; G06F 2203/04809; G02B 30/00–22; G02B 30/26; G02B 30/30–36; G02F 1/13338; B60K 35/211; B60K 2360/143–1446; H03K 2217/96; H03K 2217/96015; H03K 2217/96031; H03K 2217/96042–96046; H01H 9/18–182

See application file for complete search history.

(56) References Cited

U.S. PATENT DOCUMENTS

| | | | |
|---|---|---|---|
| 2007/0152983 A1* | 7/2007 | McKillop | G06F 3/04886 345/173 |
| 2009/0160671 A1* | 6/2009 | Shih | G06F 3/03547 345/173 |
| 2010/0309204 A1* | 12/2010 | Smith | G02B 30/30 345/419 |

(Continued)

FOREIGN PATENT DOCUMENTS

| | | |
|---|---|---|
| CN | 101751176 | 6/2010 |
| CN | 101751175 | 10/2012 |

(Continued)

*Primary Examiner* — Keith L Crawley
(74) *Attorney, Agent, or Firm* — JCIPRNET (57) ABSTRACT

Disclosed are an illuminated touchpad including a protection layer, a touch module, and a Parallax-Barrier light source module. The touch module is disposed between the protection layer and the Parallax-Barrier light source module. The Parallax-Barrier light source module has a Parallax-Barrier pattern or is used to produce the Parallax-Barrier pattern. The Parallax-Barrier light source module further has multiple patterns and produces multiple illuminated patterns by the patterns, or the Parallax-Barrier light source module directly produces the illuminated patterns. By the Parallax-Barrier pattern, lights of the illuminated patterns pass through the touch module and the protection layer to form multiple stereoscopic images.

6 Claims, 6 Drawing Sheets

(56) References Cited

U.S. PATENT DOCUMENTS

| | | | |
|---|---|---|---|
| 2010/0328438 A1* | 12/2010 | Ohyama | G06F 3/042 |
| | | | 348/51 |
| 2012/0032913 A1 | 2/2012 | Shih et al. | |
| 2012/0105434 A1* | 5/2012 | Kuo | G06F 3/0412 |
| | | | 345/419 |
| 2013/0100124 A1 | 4/2013 | Kim et al. | |
| 2013/0215076 A1* | 8/2013 | Lee | G06F 3/0446 |
| | | | 345/87 |
| 2014/0368624 A1* | 12/2014 | Na | G02B 30/27 |
| | | | 348/54 |
| 2015/0029108 A1* | 1/2015 | Kuo | H04N 13/305 |
| | | | 345/173 |
| 2015/0036062 A1* | 2/2015 | Chien | H04N 13/356 |
| | | | 349/12 |
| 2015/0138136 A1* | 5/2015 | Long | G02B 30/28 |
| | | | 345/174 |
| 2015/0338672 A1* | 11/2015 | Fang | G06F 3/041 |
| | | | 349/12 |
| 2017/0048516 A1* | 2/2017 | Yang | H10K 59/50 |
| 2017/0155893 A1* | 6/2017 | Mather | H04N 13/376 |
| 2019/0303001 A1* | 10/2019 | Kikuchi | G06F 3/044 |

FOREIGN PATENT DOCUMENTS

| | | |
|---|---|---|
| CN | 102819147 | 12/2012 |
| EP | 2346021 | 7/2011 |
| KR | 20160103769 | 9/2016 |
| TW | 201232037 | 8/2012 |

\* cited by examiner

FIG. 6

ILLUMINATED TOUCHPAD HAVING PARALLAX BARRIER LIGHT SOURCE MODULE

CROSS-REFERENCE TO RELATED APPLICATION

This application claims the priority benefit of Taiwan application serial no. 112142134, filed on Nov. 2, 2023. The entirety of the above-mentioned patent application is hereby incorporated by reference herein and made a part of this specification.

BACKGROUND

Technical Field

The disclosure relates to a touchpad, and in particular to an illuminated touchpad.

Description of Related Art

Touchpads have a wide range of applications in electronic products. For example, a touchpad may be applied to a smartphone to allow the user to quickly perform a set action or open a set application. Alternatively, the touchpad may be used in a notebook computer to replace the mouse function.

To further enhance the convenience of the touchpad, application patterns may be set on the touchpad. When the application pattern is touched, the system will open the corresponding application. However, for users, there is still room for improvement in the design of touchpads currently on the market.

SUMMARY

The disclosure provides an illuminated touchpad, which may provide intuitive operational functions.

An embodiment of the disclosure provides an illuminated touchpad, which includes a protection layer, a touch module, and a Parallax-Barrier light source module. The touch module is disposed between the protection layer and the Parallax-Barrier light source module. The Parallax-Barrier light source module has a Parallax-Barrier pattern or is used to produce the Parallax-Barrier pattern. The Parallax-Barrier light source module further has multiple patterns and produces multiple illuminated patterns by the patterns, or the Parallax-Barrier light source module directly produces the illuminated patterns. By the Parallax-Barrier pattern, lights of the illuminated pattern pass through the touch module and the protection layer to form multiple stereoscopic images.

Based on the above, in the illuminated touchpad according to an embodiment of the disclosure, the Parallax-Barrier light source module has the Parallax-Barrier pattern or is used to produce the Parallax-Barrier pattern. The Parallax-Barrier light source module also has the patterns and produces the illuminated patterns through the patterns, or the Parallax-Barrier light source module directly produces the illuminated patterns. By the Parallax-Barrier pattern, the lights of the illuminated pattern pass through the touch module and the protection layer to form the stereoscopic images. Therefore, the system may present the stereoscopic image by emitting light, allowing users to still operate the illuminated touchpad in a low-illumination environment. Moreover, the system may use the stereoscopic images to present operable actions or openable applications, thereby further enhancing an adaptability for the user to using the illuminated touchpad.

DESCRIPTION OF THE EMBODIMENTS

Figure 1:
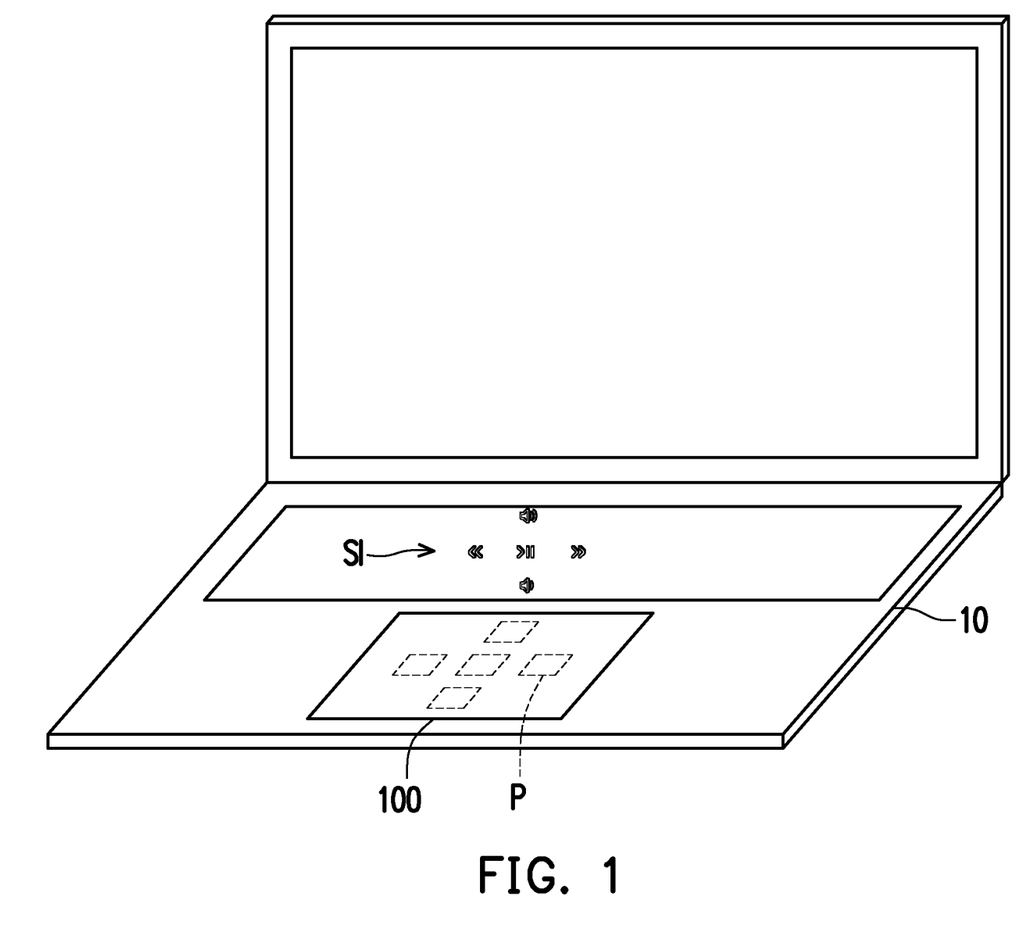
FIG. 1 is a schematic diagram of an illuminated touchpad applied in an electronic device according to an embodiment of the disclosure.
Figure 2:
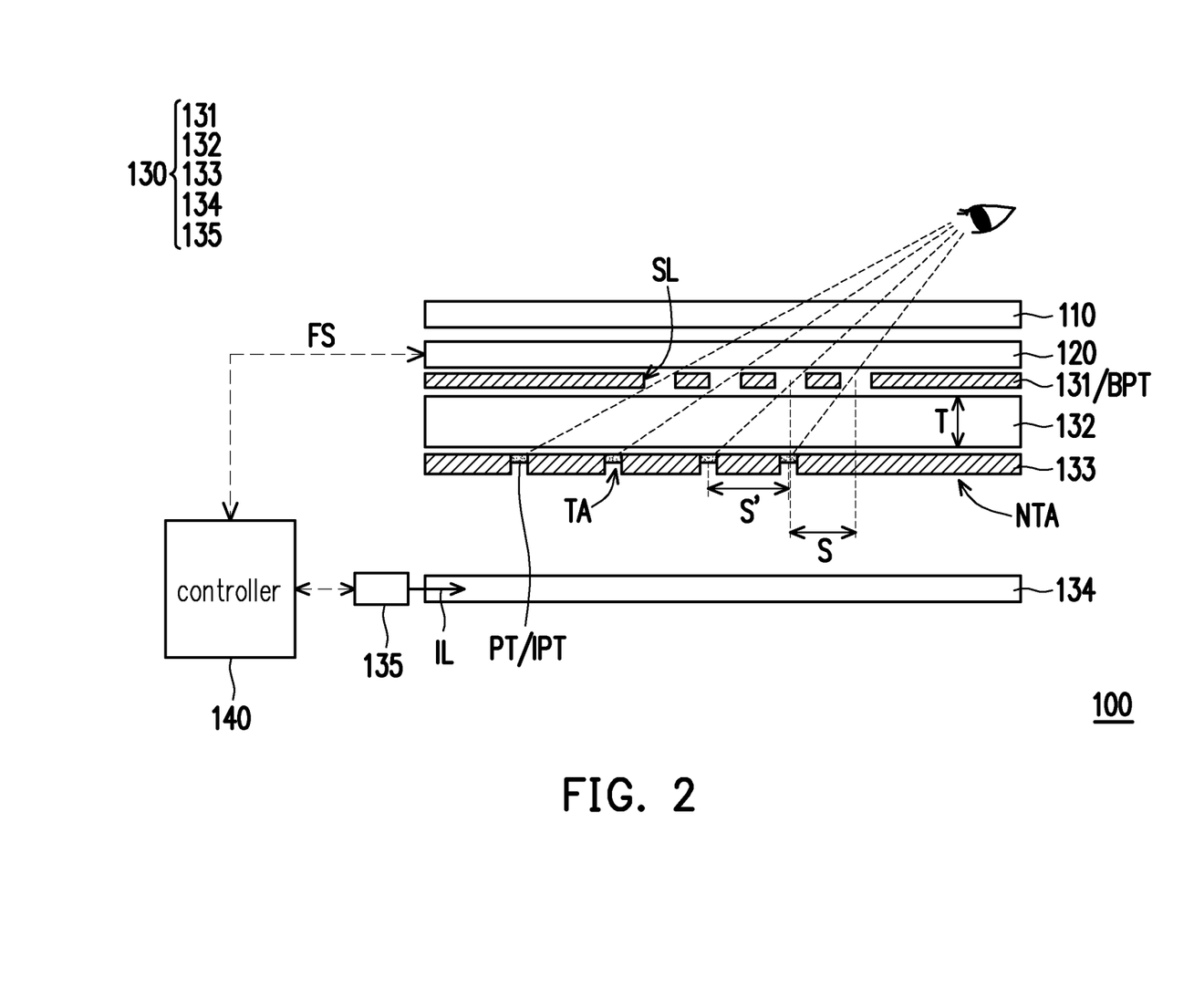
FIG. 2 is a schematic cross-sectional diagram of an illuminated touchpad according to an embodiment of the disclosure.

FIG. 1 is a schematic diagram of an illuminated touchpad applied in an electronic device according to an embodiment of the disclosure. FIG. 2 is a schematic cross-sectional diagram of an illuminated touchpad according to an embodiment of the disclosure. Referring to FIGS. 1 and 2, an embodiment of the disclosure provides an illuminated touchpad 100, which is suitable for application in an electronic device 10. The electronic device 10 is, for example, a notebook computer, a smart phone or a keyboard, but the disclosure is not limited thereto.

In this embodiment, the illuminated touchpad 100 includes a protection layer 110, a touch module 120, and a Parallax-Barrier light source module 130. The protection layer 110 is, for example, a flat plate made of transparent materials such as plastic or glass. In an embodiment, the protection layer 110 may be a transparent plate under atomization treatment.

In this embodiment, the touch module 120 is disposed between the protection layer 110 and the Parallax-Barrier light source module 130. The Parallax-Barrier light source module 130 has a Parallax-Barrier pattern BPT or is used to produce the Parallax-Barrier pattern BPT. The Parallax-Barrier light source module 130 further has multiple patterns PT and produces multiple illuminated patterns IPT by the patterns PT, or the Parallax-Barrier light source module 130 directly produces the illuminated patterns IPT. By the Parallax-Barrier pattern BPT, lights from the illuminated pattern IPT pass through the touch module 120 and the protection layer 110 to form multiple stereoscopic images SI.

Specifically, in this embodiment, the Parallax-Barrier light source module 130 includes a Parallax-Barrier pattern layer 131, a substrate 132, a pattern layer 133, a light guide layer 134, and a light source 135. The Parallax-Barrier pattern layer 131 includes the Parallax-Barrier pattern BPT. The Parallax-Barrier pattern layer 131 is disposed between the touch module 120 and the substrate 132. The pattern layer 133 is disposed on one side of the substrate 132 relative to the Parallax-Barrier pattern layer 131 and includes the pattern PT. The pattern layer 133 has a transparent area TA and a non-transparent area NTA. The pattern PT is disposed in the transparent area TA.

For example, the non-transparent area NTA may be in black opaque ink. Alternatively, a color of the non-transparent area NTA may be the same as a color of the electronic device 10 so that the illuminated touchpad 100 is visually consistent with the electronic device 10 when the illuminated touchpad 100 does not emit light.

In order to improve the visual consistency between the illuminated touchpad 100 and the electronic device 10 when the illuminated touchpad 100 does not emit light, in this embodiment, a light transmittance of the transparent area TA is preferably less than 70%.

In this embodiment, the light source 135 is, for example, a light-emitting diode (LED) light source or other suitable light source. The light source 135 is disposed next to the light guide layer 134 and used to emit an illumination beam IL. The pattern layer 133 is disposed between the substrate 132 and the light guide layer 134. The light guide layer 134 is, for example, a light guide film or a light guide plate. The illumination beam IL is first transmitted to the light guide layer 134, and then transmitted to the pattern PT by the light guide layer 134 to produce the illuminated pattern IPT. The light of the illuminated pattern IPT sequentially passes through the substrate 132, the Parallax-Barrier pattern layer 131, the touch module 120, and the protection layer 110 to form the stereoscopic image SI. That is to say, when the illumination beam IL is transmitted to the pre-designed pattern PT to produce the illuminated patterns IPT, the illuminated patterns IPT are transmitted to a left eye or a right eye of a viewer by the Parallax-Barrier pattern layer 131, so that the viewer may have the effect of seeing the stereoscopic image SI in visual. Taking FIG. 1 as an example, the stereoscopic image SI may be played, forward, backward, volume up, volume down, etc. In another embodiment, the stereoscopic image SI may also be presented in a form of text.

In this embodiment, the illuminated touchpad 100 further includes a controller 140. The controller 140 is electrically connected to the touch module 120 and the Parallax-Barrier light source module 130. The controller 140 controls the Parallax-Barrier light source module 130 to produce the illuminated pattern IPT, and produces a corresponding function signal FS when a position P corresponding to the stereoscopic image SI on the illuminated touchpad 100 (the protection layer 110) is touched.

In this embodiment, the controller 140 includes, for example, a microcontroller unit (MCU), a central processing unit (CPU), a microprocessor, a digital signal processor (DSP), a programmable controller, a programmable logic device (PLD), or other similar devices, or combinations of these devices. The disclosure is not limited thereto. In addition, in an embodiment, each of the functions of the controller 140 may be implemented as multiple program codes. The program codes are stored in a memory, and the controller 140 executes the program codes. Alternatively, in an embodiment, each of the functions of the controller 140 may be implemented as one or more circuits. The disclosure is not limited to implementing each function of the controller 140 in a way of software or hardware.

In this embodiment, the Parallax-Barrier pattern BPT has multiple slits SL. The illuminated touchpad 100 satisfies a relationship below: S'>S. S is a spacing between any two adjacent slits SL, and S' is a spacing between two patterns PT or two illuminated patterns IPT corresponding to the any two adjacent slits SL.

In this embodiment, the illuminated touchpad 100 further satisfies a relationship below:

$$1.00005 \le S'/S \le 1.005.$$

For example, the substrate 132 has a refractive index, such as the refractive index of 1.3. The light is refracted when passing through the substrate 132 (but in order to facilitate the explanation of the relationship between the spacings S and S', FIG. 2 simply illustrates that the light of the illuminated pattern IPT passes through the slit SL in a straight line and then is transmitted to the viewer). Therefore, the illuminated touchpad 100 needs to satisfy the relationship of S'>S. Further considering a thickness T of the substrate 132, for example, T<0.6 mm, the light-illuminated touchpad 100 preferably satisfies the relationship of 1.00005≤S'/S≤1.005.

Figure 3:
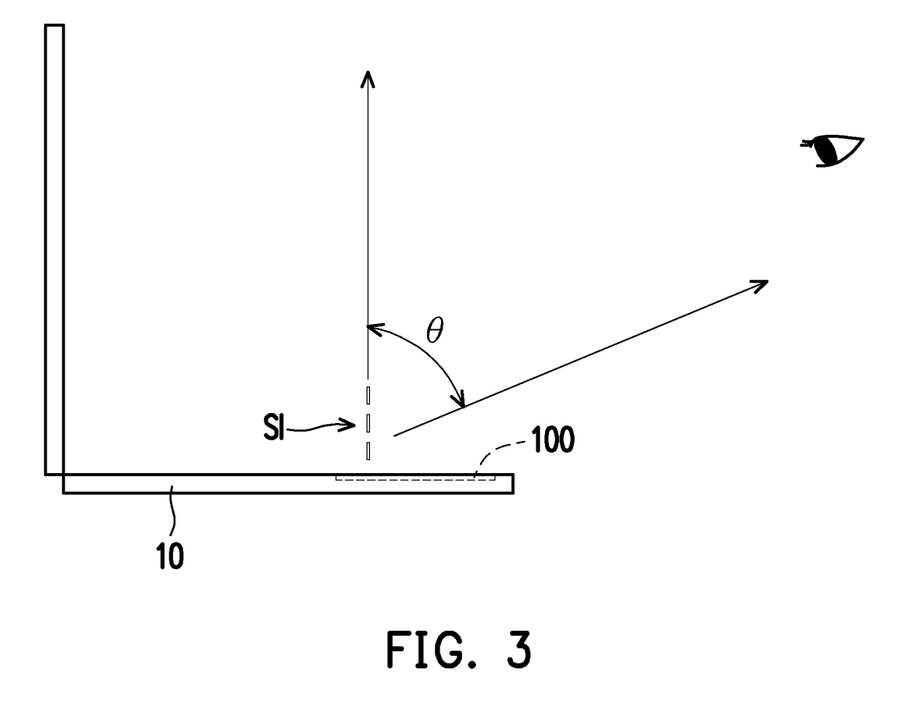
FIG. 3 is a schematic diagram of a viewing angle of a stereoscopic image of an illuminated touchpad according to an embodiment of the disclosure.

FIG. 3 is a schematic diagram of a viewing angle of a stereoscopic image of an illuminated touchpad according to an embodiment of the disclosure. Referring to FIG. 3, in this embodiment, a viewing angle θ of the stereoscopic image SI is less than or equal to 80 degrees.

Based on the above, in an embodiment of the disclosure, the illuminated touchpad 100 includes the protection layer 110, the touch module 120, and the Parallax-Barrier light source module 130. The Parallax-Barrier light source module 130 has the Parallax-Barrier pattern BPT or is used to produce the Parallax-Barrier pattern BPT. The Parallax-Barrier light source module 130 further has the patterns PT and produces the illuminated patterns IPT by the patterns PT, or the Parallax-Barrier light source module 130 directly produces the illuminated patterns IPT. By the Parallax-Barrier pattern BPT, the lights from the illuminated pattern IPT passes through the touch module 120 and the protection layer 110 to form the stereoscopic images SI. Therefore, a system may present the stereoscopic image SI by emitting light, so that the user may still operate the illuminated touchpad 100 in a low-illumination environment. Moreover, the system may use the stereoscopic image SI to present operable actions or openable applications, thereby further enhancing the adaptability of the user for using the illuminated touchpad 100.

Figure 4:
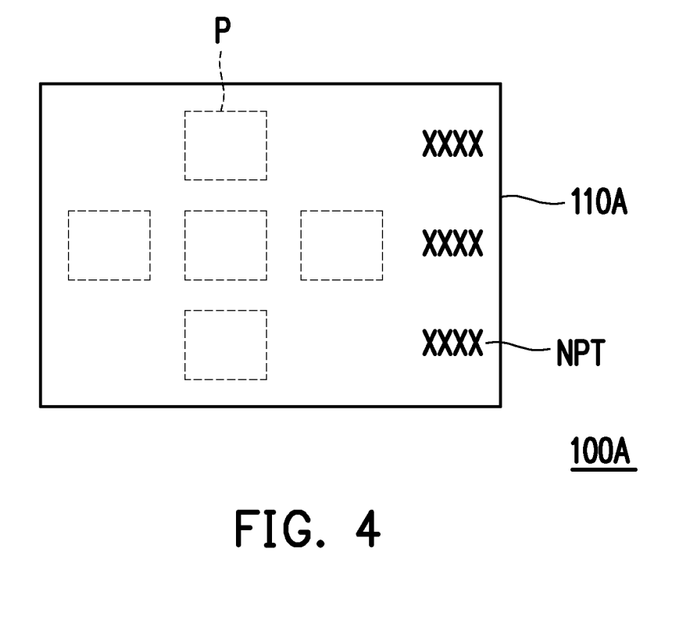
FIG. 4 is a schematic diagram of an illuminated touchpad according to an embodiment of the disclosure.

FIG. 4 is a schematic diagram of an illuminated touchpad according to an embodiment of the disclosure. Referring to FIG. 4, an illuminated touchpad 100A is similar to the illuminated touchpad 100 of FIG. 2. The main differences are as follows. In this embodiment, a protection layer 110A has multiple non-illuminated patterns NPT on the side relative to the touch module 120. When the position corresponding to the non-illuminated pattern NPT on the illuminated touchpad 100A (the protection layer 110A) is touched, the controller 140 produces the corresponding function signal FS. For example, the non-illuminated pattern NPT may be a pattern or a name of a commonly used application (such as a browser, a calculator software, a video software, etc.). When the user touches the non-illuminated pattern NPT, the system may open the corresponding application.

Figure 5:
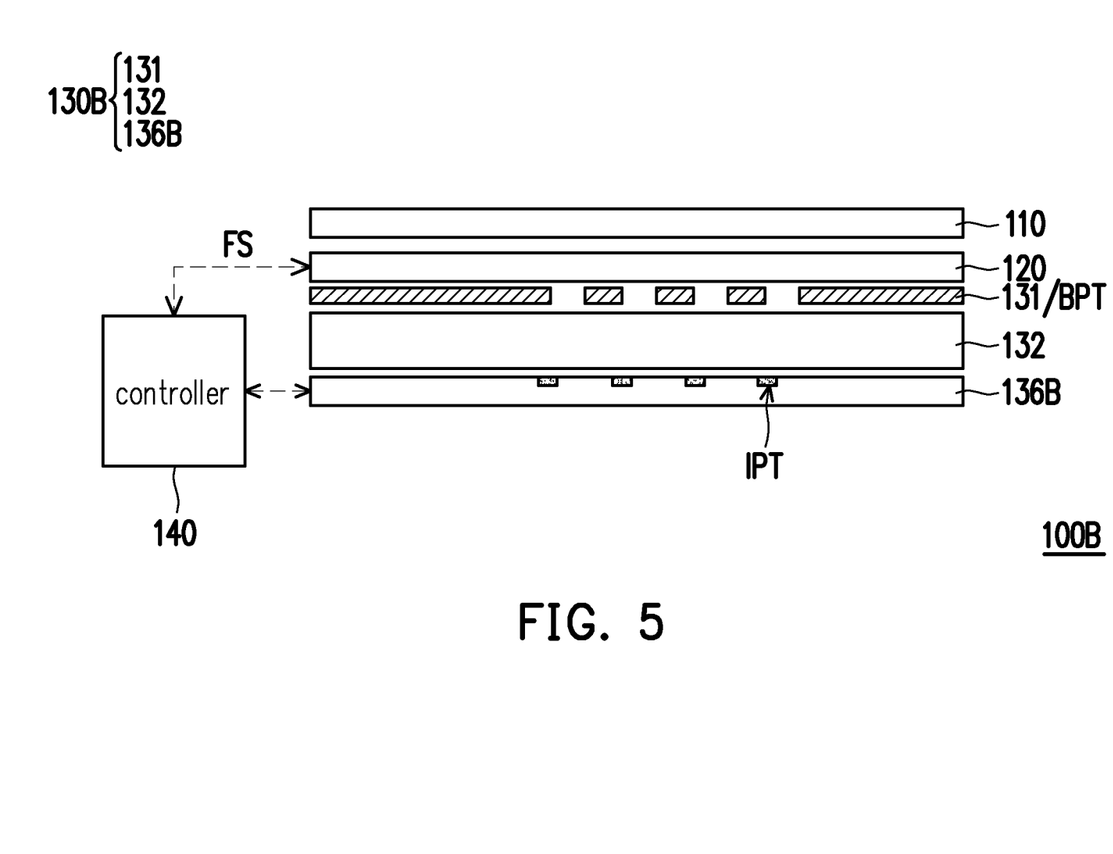
FIG. 5 is a schematic cross-sectional diagram of an illuminated touchpad according to an embodiment of the disclosure.

FIG. 5 is a schematic cross-sectional diagram of an illuminated touchpad according to an embodiment of the disclosure. Referring to FIG. 5, an illuminated touchpad 100B is similar to the illuminated touchpad 100 of FIG. 2 or the illuminated touchpad 100A of FIG. 4. The main differences are as follows. In this embodiment, a Parallax-Barrier light source module 130B includes the Parallax-Barrier pattern layer 131, the substrate 132, and a display module 136B. The display module 136B is, for example, a liquid crystal display, an organic light emitting diode (OLED) display, etc. The display module 136B is disposed on one side of the substrate 132 relative to the Parallax-Barrier pattern layer 131 and is used to produce the illuminated pattern IPT. The lights of the illuminated pattern IPT sequentially pass through the substrate 132, the Parallax-Barrier pattern layer 131, the touch module 120, and the protection layer 110 to form the stereoscopic image SI. That is to say, the display module 136B may directly produce the illuminated pattern IPT. Therefore, the system may change the stereoscopic image SI produced by the illuminated touchpad 100B by changing the illuminated pattern IPT through the display module 136B; alternatively, the stereoscopic image SI produced by the illuminated touchpad 100B may be changed according to different applications opened in the system.

Figure 6:
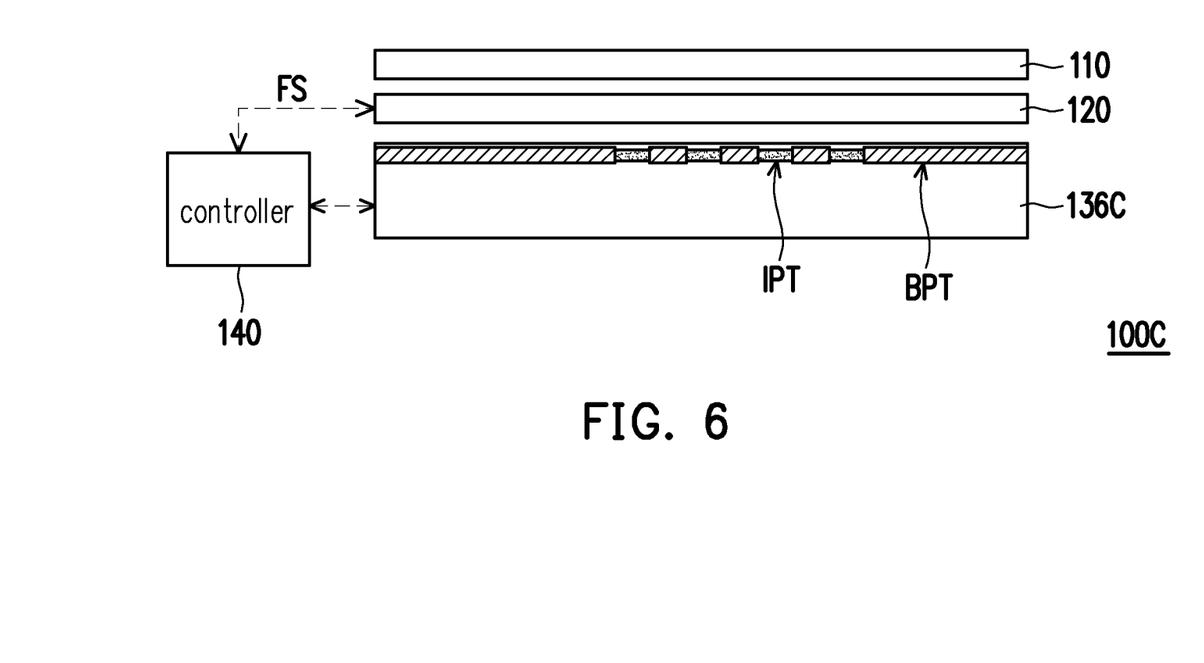
FIG. 6 is a schematic cross-sectional diagram of an illuminated touchpad according to an embodiment of the disclosure.

FIG. 6 is a schematic cross-sectional diagram of an illuminated touchpad according to an embodiment of the disclosure. Referring to FIG. 6, an illuminated touchpad 100C is similar to the illuminated touchpad 100B of FIG. 5. The main differences are as follows. In this embodiment, a Parallax-Barrier light source module 130C includes a display module 136C. The touch module 120 is disposed between the protection layer 110 and the display module 136C. The display module 136C is, for example, a 3D display. The display module 136C is used to produce the Parallax-Barrier pattern BPT and the illuminated pattern IPT. By the Parallax-Barrier pattern BPT, the lights from the illuminated pattern IPT sequentially pass through the touch module 120 and the protection layer 110 to form the stereoscopic image SI. That is to say, the display module 136C may not only directly produce the illuminated pattern IPT, but also produce the Parallax-Barrier pattern BPT. Moreover, in another embodiment, the display module 136C may further control the position of the illuminated pattern IPT or the position of the slit in the Parallax-Barrier pattern BPT. Therefore, the system may change the stereoscopic image SI produced by the illuminated touchpad 100C by changing the illuminated pattern; or, the stereoscopic image SI produced by the illuminated touchpad 100C may be changed according to different applications opened by the system.

To sum up, in an embodiment of the disclosure, the illuminated touchpad includes the protection layer, the touch module, and the Parallax-Barrier light source module. The Parallax-Barrier light source module has the Parallax-Barrier pattern or is used to produce the Parallax-Barrier pattern. The Parallax-Barrier light source module further has the patterns and produces the illuminated patterns by the patterns, or the Parallax-Barrier light source module directly produces the illuminated patterns. By the Parallax-Barrier pattern, the lights of the illuminated pattern pass through the touch module and the protection layer to form the stereoscopic images. Therefore, the system may present the stereoscopic image by emitting light, allowing users to still operate the illuminated touchpad in the low-illumination environment. Moreover, the system may use the stereoscopic images to present the operable actions or the openable applications, thereby further enhancing the adaptability of the user for using the illuminated touchpad.

What is claimed is:

1. An illuminated touchpad, comprising:
   a protection layer;
   a touch module;
   a Parallax-Barrier light source module, wherein the touch module is disposed between the protection layer and the Parallax-Barrier light source module, the Parallax-Barrier light source module has a Parallax-Barrier pattern or is disposed to produce the Parallax-Barrier pattern, the Parallax-Barrier light source module further has a plurality of patterns and produces a plurality of illuminated patterns by the plurality of patterns, or the Parallax-Barrier light source module directly produces the plurality of illuminated patterns, wherein the Parallax-Barrier light source module comprises:
   a display module, wherein the touch module is disposed between the protection layer and the display module, the display module is disposed to produce the Parallax-Barrier pattern and the plurality of illuminated patterns, the Parallax-Barrier pattern has a plurality of slits, the display module is adapted to control positions of the plurality of illuminated patterns and positions of the plurality of slits of the Parallax-Barrier pattern, the plurality of illuminated patterns and the Parallax-Barrier pattern are imaged on the same plane, the plurality of illuminated patterns are produced in the plurality of slits of the Parallax-Barrier pattern, and
   by the Parallax-Barrier pattern, lights of the plurality of illuminated patterns pass through the touch module and the protection layer to form a plurality of stereoscopic images; and
   a controller, electrically connected to the touch module and the Parallax-Barrier light source module,
   wherein the controller controls the Parallax-Barrier light source module to produce the plurality of illuminated patterns, and produces corresponding function signals in response to a position corresponding to the plurality of stereoscopic images on the illuminated touchpad being touched.

2. The illuminated touchpad according to claim 1, wherein a viewing angle of the plurality of stereoscopic images is less than or equal to 80 degrees.

3. The illuminated touchpad according to claim 1, wherein:
   S'>S,
   wherein S is a spacing between any two adjacent slits, and S' is a spacing between two patterns or two illuminated patterns corresponding to the any two adjacent slits.

4. The illuminated touchpad according to claim 1, wherein:

$$1.00005 \leq S'/S \leq 1.005,$$

wherein S is a spacing between any two adjacent slits, and S' is a spacing between two patterns or two illuminated patterns corresponding to the any two adjacent slits.

5. The illuminated touchpad according to claim 1, wherein the protection layer has a plurality of non-illuminated patterns on one side relative to the touch module.

6. The illuminated touchpad according to claim 5, wherein in response to a position corresponding to the plurality of non-illuminated patterns on the illuminated touchpad being touched, the controller produces other corresponding function signals.

* * * * *